ends of the sheets prior to bringing them into abutment so as to square the ends thereof to be welded and consequently to form a perfect weld.

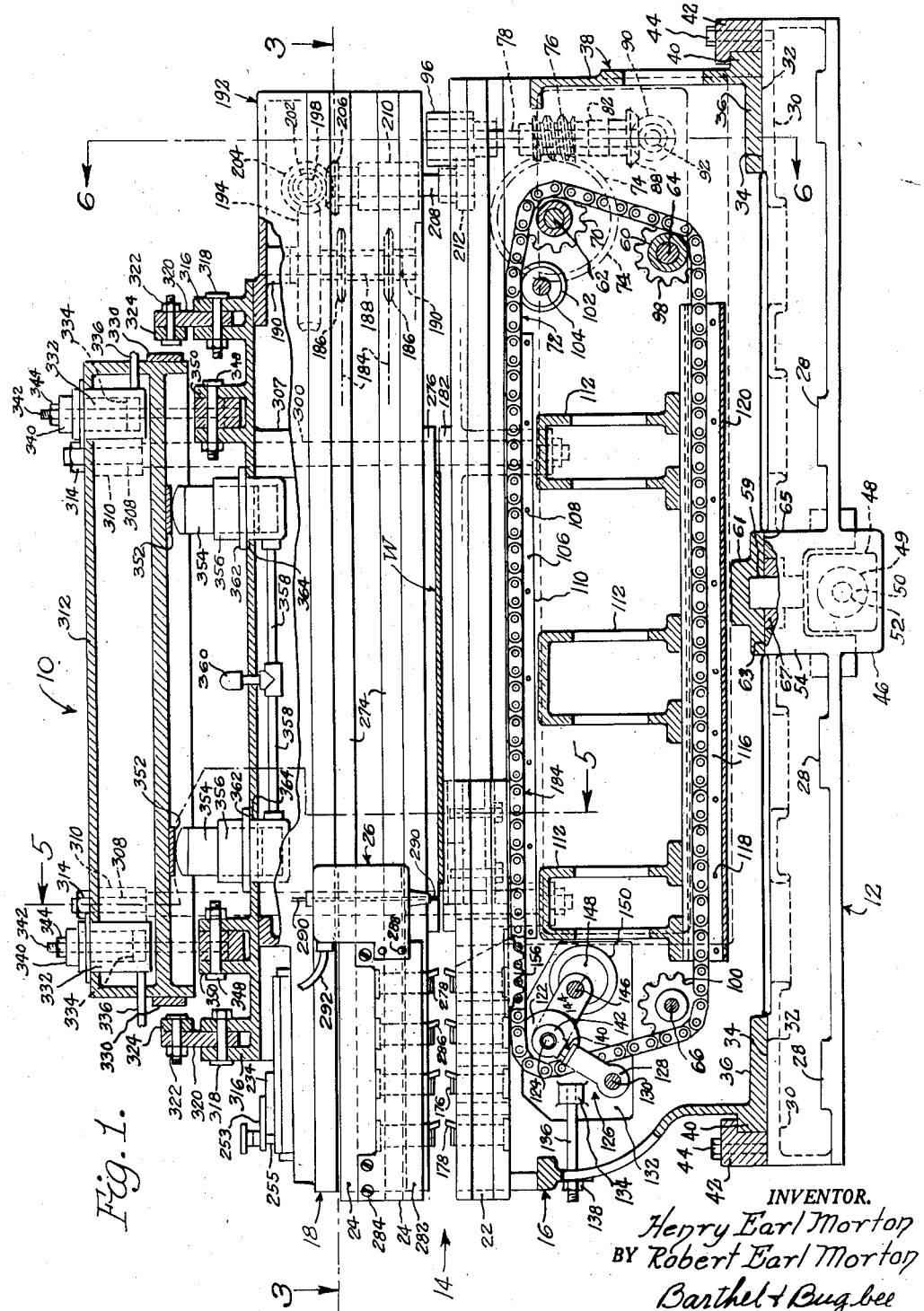

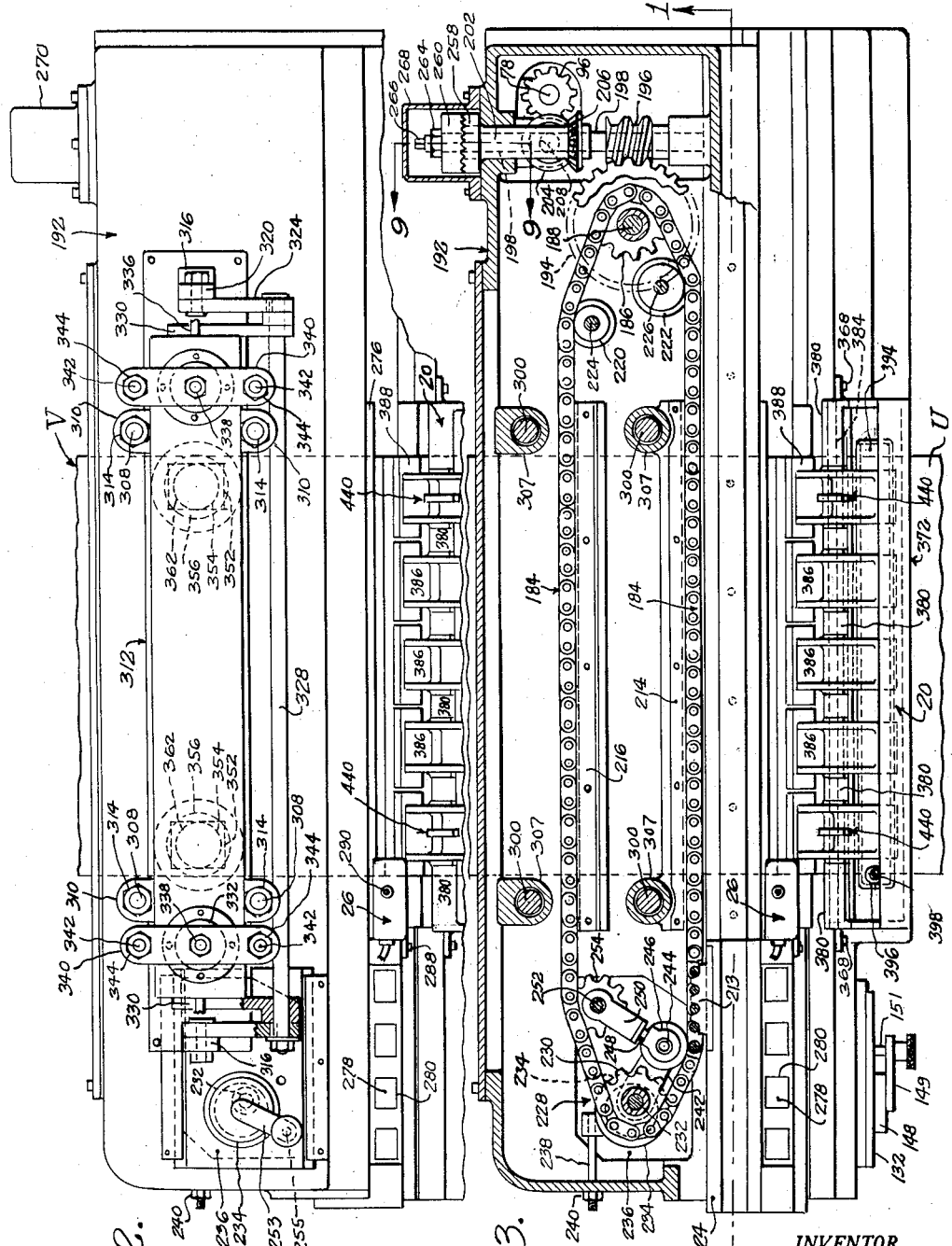

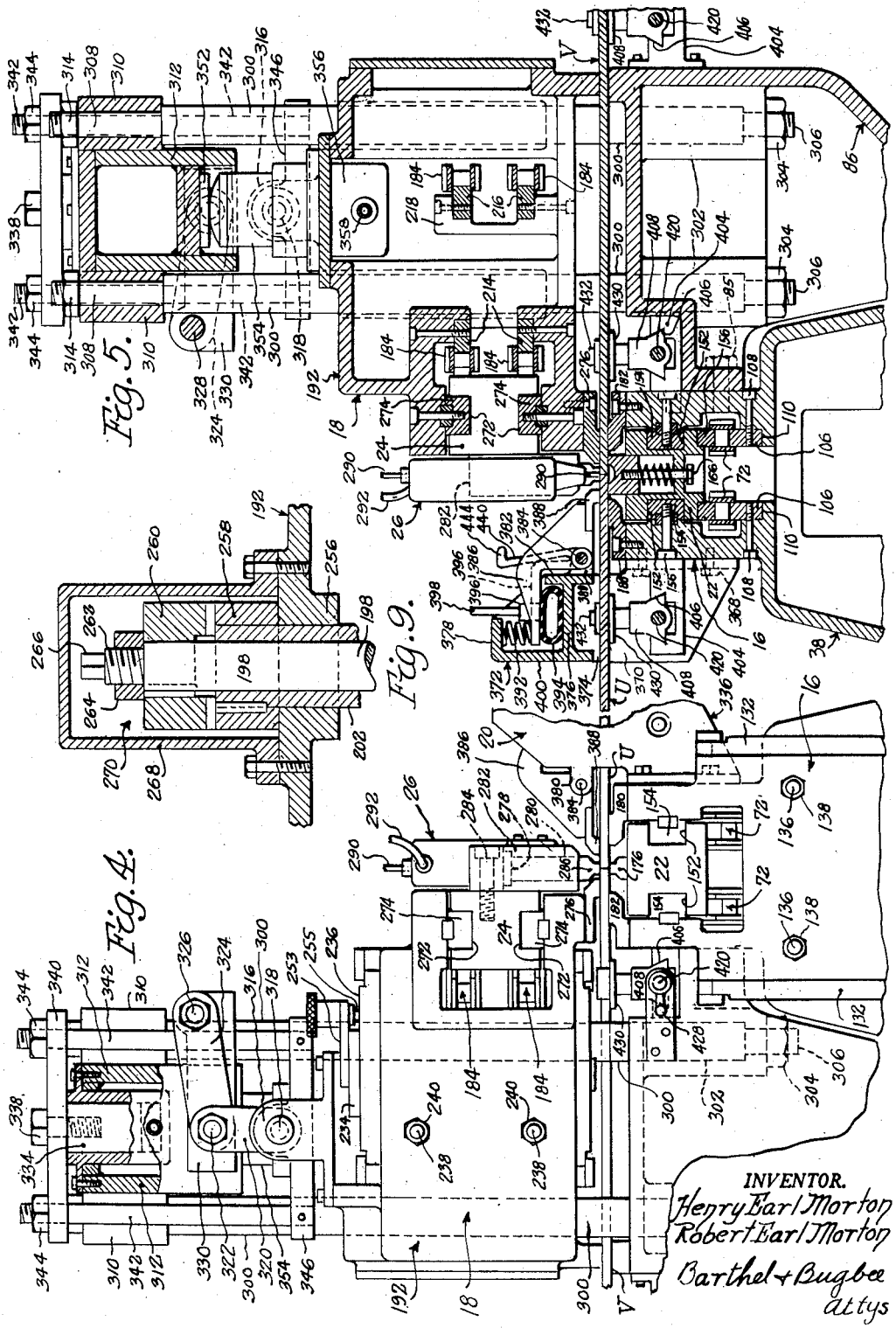

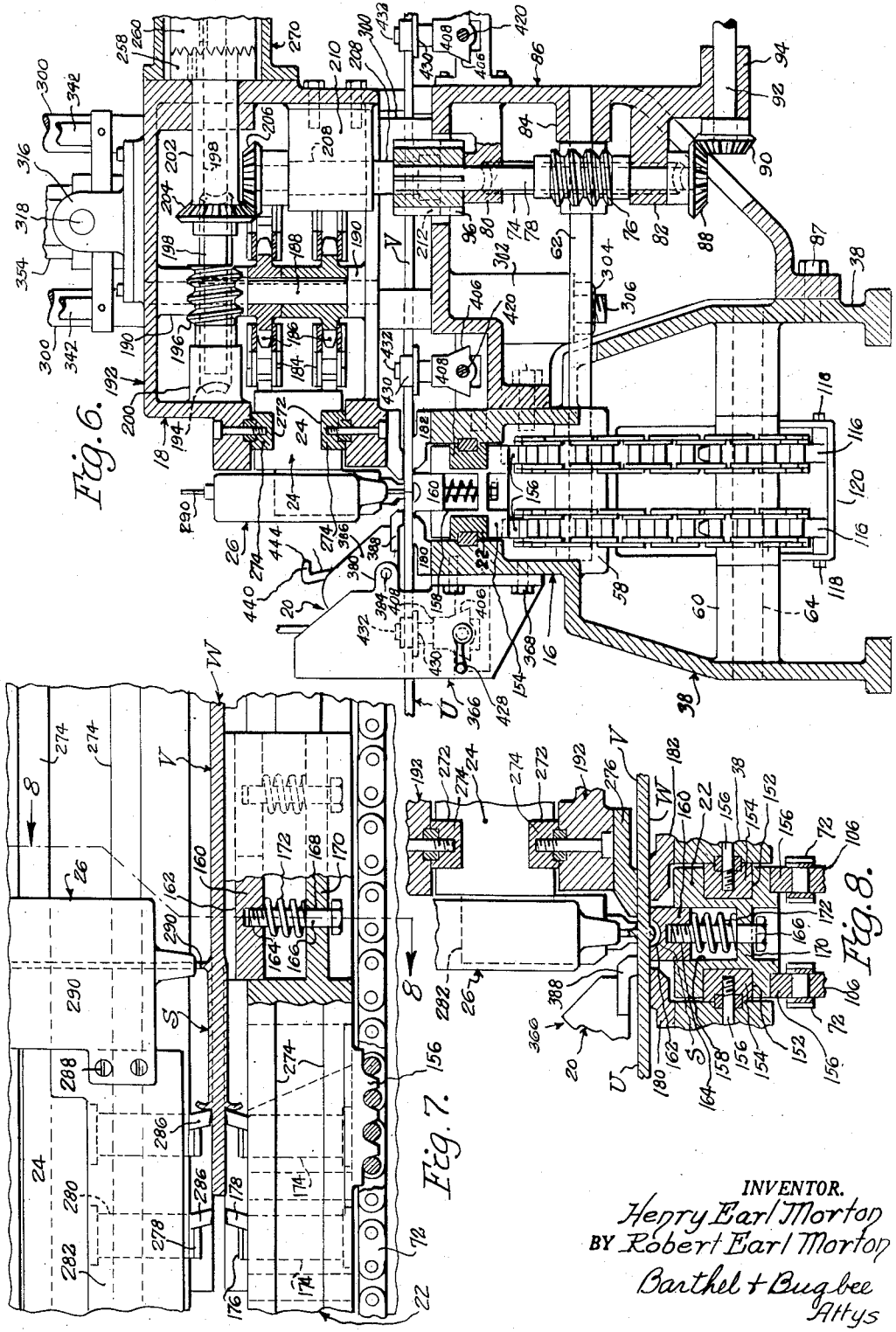

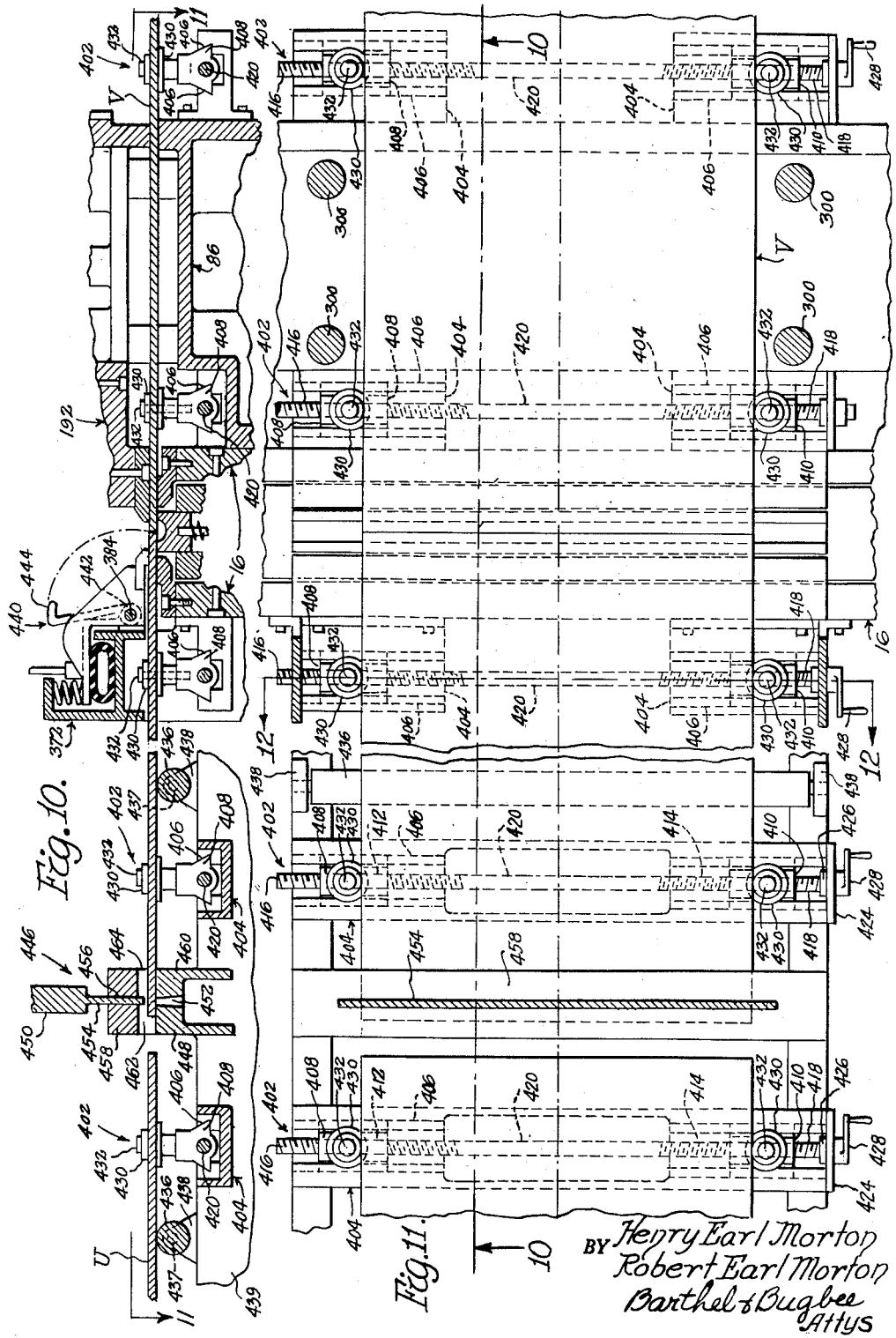

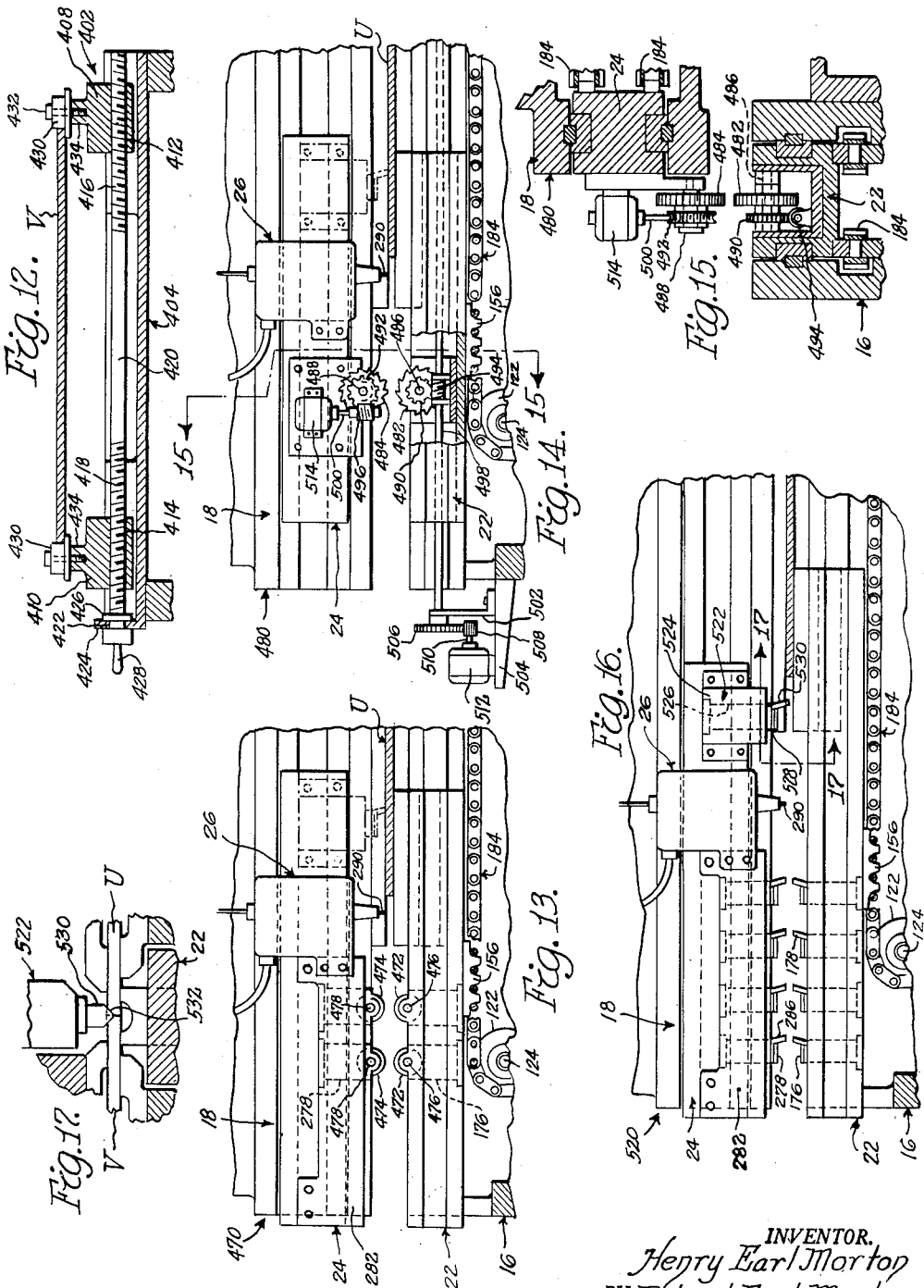

Other objects and advantages of the invention will become apparent during the course of the following description of the accompanying drawings, wherein:

Figure 1 is a side elevation, partly in vertical section, of a combined welding and seam-trimming machine according to one form of the invention, with the lower portion of the view taken along the section line 1—1 in Figure 3;

Figure 2 is a top plan view of the machine shown in Figure 1, with the front part of the machine omitted, because it is duplicated in Figure 3;

Figure 3 is a horizontal section taken along the line 3—3 in Figure 1, with the front part of the machine in top plan view, being below the section plane;

Figure 4 is a left-hand end elevation of the machine shown in Figures 1 to 3 inclusive with a portion of the front part removed for compactness of showing;

Figure 5 is a vertical cross-section taken along the line 5—5 in Figure 1;

Figure 6 is a vertical cross-section taken along the line 6—6 in Figure 1;

Figure 7 is an enlarged fragmentary view of the left-hand end portion of Figure 1 adjacent the welding and leading trimming tools, with certain portions of the machine in section, to illustrate the operation thereof more clearly, after the welding and trimming rams have executed a portion of a working stroke from the starting position of Figure 1;

Figure 8 is a fragmentary vertical cross-section taken along the line 8—8 in Figure 7;

Figure 9 is an enlarged vertical cross-section taken along the line 9—9 in Figure 3.

Figure 10 is an enlarged vertical longitudinal section through the portion of the machine adjacent the sheets to be welded, taken along the line 10—10 in Figure 11;

Figure 11 is a horizontal section immediately above the sheets to be welded, taken along the line 11—11 in Figure 10;

Figure 12 is a vertical cross-section taken along the line 12—12 in Figure 11;

Figure 13 is a fragmentary side elevation of a modification of the cutting and welding mechanism shown in the middle of the left-hand side of Figure 1, wherein the flash is rolled down by rollers;

Figure 14 is a fragmentary side elevation of a second modification for the same purpose as the form shown in Figure 13, but employing milling cutters for trimming off the flash;

Figure 15 is a vertical section taken along the line 15—15 in Figure 14;

Figure 16 is a fragmentary side elevation similar to Figures 13 and 14 but showing a further modification wherein an advance cutter bevels the abutment edges of the sheets to be welded prior to welding, in order to facilitate welding; and Figure 17 is a fragmentary vertical cross-section taken along the line 17—17 in Figure 16.

General description

Hitherto, the design of structures or machines employing sheet steel has been more difficult because of the limits of steel rolling mill equipment for turning out steel sheets beyond a width which is undesirably small from the designer's viewpoint. Consequently, there has arisen a demand for steel sheets beyond the capacity of present rolling mill equipment. The present machine enables sheets of steel of conventional sizes and widths to be welded edge-to-edge to produce fabricated sheets of sizes far beyond the capacity of present rolling mill equipment and at the same time to perform the lining up, welding and seam trimming in a rapid, efficient and low-cost manner. The production of such fabricated steel sheets results in the formation of beads or ridges of excess metal at the seams on opposite sides of the joint between the component sheets united to make up the fabricated sheet. Hitherto, the removal of this excess metal has required the transfer of the fabricated sheet from the welding machine to a trimming machine, but in the case of the very large fabricated sheets intended to be produced by the present apparatus, the manipulation of such sheets and the accurate positioning of the seam-trimming cutters and seam relatively to one another would present serious problems due to the great weight and unwieldy character of the fabricated sheet, with consequent high costs of production.

The present invention provides a combined welding and seam-trimming machine wherein the welding apparatus is mounted upon the same ram as one set of the seam-trimming cutters, in a position immediately preceding the leading cutter, so that immediately after the weld has been made and the seam produced at the joint, resulting in a bead or ridge of metal on each side of the fabricated plate or sheet at the joint between them, the cutters remove the excess metal occurring in these seams. Furthermore, the excess metal in these ridges or beads, having been just formed by the welding apparatus, is still hot and soft, in that it has not had time to cool and harden, so that it is more easily removed than when it is allowed to cool and removal is then attempted.

Moreover, the present machine, instead of requiring two handlings, first of the separate component sheets and afterward of the fabricated or composite sheet, and the resulting two separate aligning operations, requires only a single handling and aligning operation, thus reducing the time, difficulty and cost of handling. In addition, the present machine is so constructed that one of the component sheets can be first aligned and clamped, after which the other sheet is brought into edge-to-edge abutment with the edge of the clamped sheet and is then itself clamped in position. The upper and lower rams are then started in reciprocation, whereupon the welding device welds the abutting edges together and at the same time causes a ridge or bead to form along the junction of the two plates. This ridge or bead is immediately removed by the trimming cutters attached to the rams, the upper cutters following immediately behind the welding device. The composite plate, thus welded and trimmed, is then unclamped and removed from the machine for further operations elsewhere.

*Detailed description*

Referring to the drawings in detail, Figure 1 shows a combined welding and seam-trimming machine, generally designated 10, according to one form of the invention as mounted upon a base structure, generally designated 12, upon which the clamping, welding and cutting assembly, generally designated 14, is reciprocably mounted in a direction across the composite or fabricated sheet W which is formed of individual sheets or plates U and V welded together along a seam S (Figure 8). The clamping, welding and cutting assembly 14 is in turn subdivided into a lower non-adjustable unit 16 and an upper adjustable unit 18 movable up and down relatively thereto for purposes of clamping and unclamping the fabricated sheet W or the plates or sheets U and V from which it is made. An independent clamping unit, generally designated 20 (Figures 5 and 6) is mounted on the lower unit 16 for engagement with one of the workpieces U and V.

Each of the clamping and cutting units 16 and 18 contains a reciprocating cutting ram mechanism 22 and 24 respectively mounted in the lower and upper units 16 and 18 respectively, the ram mechanism 22 and 24 being reciprocated by chain and sprocket mechanisms as described below. A welding device 26 is mounted on the upper ram 24 as described in more detail below.

*Base construction and adjustment*

The clamping, welding and cutting assembly 14 may either be fixedly or adjustably mounted on the base structure 12, according to the desire of the manufacturer or user, and as shown in Figure 1 for purposes of illustration, the assembly 14 is reciprocably mounted upon the base structure 12 for convenience in aligning the cutting rams 22 and 24 and welding device 26 with the abutting edges of the component sheets U and V. The base structure 12 is of inverted shallow box-shaped form with bosses 28 along the flanged lower edge thereof for receiving holddown bolts or other fasteners. The base structure 12 is also provided with an upper wall 30, the opposite ends of which are machined to an accurately flat condition along surfaces 32. Resting upon the machine surfaces 32 are the correspondingly machined lower surfaces 34 on the bottom end members 36 of a lower housing 38 containing or supporting the principal working parts of the lower clamping and cutting unit 16. The bottom end members 36 have projecting guide ribs 40 which are engaged by guide bars 42 of inverted L-shaped cross-section which are bolted as at 44 to the base structure 12.

The base structure 12 midway between its opposite ends is provided with a downwardly-extending supporting portion 46. The latter is hollow and contains a hydraulic cylinder 48 (Figure 1) containing a bore 49 in which a piston head 50 on a piston rod 52 is mounted. The opposite ends of the piston rod 52 are connected to the opposite end walls 54 of the supporting portion 46 (one only being shown) and the cylinder 48 is secured to a block 56 which in turn is bolted in a correspondingly-shaped recess 59 in the bottom of a bridge or cross member 61 which extends from side to side of the housing 38 parallel to the end members 36 and similarly provided with a machined lower surface 63 slidably engaging the correspondingly-machined upper surface 65 of the supporting portion 46. Spaced parallel wear bars 67 are provided for a purpose which their name indicates, and are mounted on the opposite sides of the block 56 in the suitably-recessed upper wall 30 of the base structure 12. As a consequence, when pressure fluid is admitted to one end of the cylinder bore 49 and discharged from the other end thereof, the cylinder 49 is reciprocated relatively to the base structure 12, carrying with it the entire clamping, welding and cutting assembly 14 mounted thereon, as explained below in connection with the operation of the invention.

*Lower unit construction*

The lower clamping and cutting unit 16 on which the sheets U and V of steel or other metal are held in edge-to-edge abutment while they are welded and then trimmed at their seam, is mounted in the lower housing structure 38, which is also of hollow box-like construction. Journaled in upper and lower bearing bosses 58 and 60 respectively (Figure 6) in the lower housing structure 38 are shafts 62, 64 and 66. Keyed or otherwise secured to the sprocket shaft 62 is a pair of laterally-spaced chain sprockets 70 which drive a pair of laterally-spaced endless lower roller chains 72. Drivingly secured to the sprocket shaft 62 is a worm wheel 74 with which meshes a worm 76 keyed or otherwise drivingly secured to a vertical shaft 78 (Figures 1 and 6). The shaft 78 is journaled in upper and lower bearing brackets 80 and 82 respectively (Figure 6) and the rearward end of the shaft 62 is likewise journaled in a bearing boss 84 in an auxiliary lower housing, generally designated 86, bolted or otherwise secured as at 85 and 87 to the upper and lower side portions of the lower housing 38 (Figure 6).

Keyed or otherwise drivingly secured to the lower end of the vertical shaft 78 is a bevel pinion 88 with which meshes a bevel pinion 90. The bevel pinion 90 is keyed or otherwise drivingly secured to a shaft 92 journaled in a bearing boss 94 at the lower rearward edge of the auxiliary housing 86 (Figure 6). Keyed or otherwise drivingly secured to the upper end of the vertical shaft 78 is an elongated pinion 96 by which the drive is transmitted to the upper clamping, welding and cutting unit 18 as discussed below.

The endless chains 72, after passing over the drive sprockets 70, travel in approximately rectangular paths disposed in parallel planes, with the chain 72 supported at the lower "corners" of its orbit by idler sprockets 98 and 100 rotatably mounted upon the shafts 64 and 66 respectively. Approximately above the idler sprockets 98 and to one side of the drive sprockets 70, the chains 72 are additionally supported by grooved idler rollers 102 mounted side by side in laterally-spaced relationship on the cross shaft 104. Immediately adjacent the grooved rollers 102, the upper course of each chain 72 is supported by a guide bar 106 bolted or otherwise secured as at 108 to the side walls of the housing 38, which is rabbeted as at 110 (Figure 5) to receive and support the guide bars 106. Beneath the guide bars 106, the housing 38 is strengthened by integral cross members 112 (Figure 1). The lower courses of the endless chains 72 are similarly supported by guide bars 116 similarly secured at 118 to the side walls of the lower housing 38. A flanged channel-shaped housing 120 is disposed beneath the guide bars 116 and is secured thereto by the same bolts 118 (Figure 1).

The remaining upper corners of the orbits of the endless chains 72 are adjustably supported by a pair of axially-spaced grooved rollers 122 mounted on a shaft 124 forming part of a chain-collapsing device, generally designated 126. The chain-collapsing device 126 includes a pair of hollow arms 128 pivotally mounted on a cross shaft 130, the opposite ends of which are mounted in two parallel slide plates 132 which have bosses 134 thereon bored and threaded to receive the inner ends of adjusting rods 136 which pass through the end wall of the lower housing 38 and have their outer ends threaded to receive adjusting nuts 138 (Figure 1). The hollow arms 128 contain spring-urged plungers 140 carrying hubs 142 at their outer ends in which the opposite ends of the shaft 124 are mounted. The shaft 124 also passes through the suitably bored end of a link 144, the opposite end of which is bored to receive a shaft 146, the opposite ends of which are mounted in eccentric discs 148 rotatably mounted in stepped bores 150 in the slide plates 132. The eccentric discs 148 are rotated by a hand crank 149 with a reciprocable locking pin 151 to swing the grooved rollers 122 away from the upper corners of the chain orbits (Figure 1) in order to collapse the chains 72. The locking pin 151 is selectively insertable in holes or sockets (not shown) disposed in the housing 38 at equal radii from the center of the shaft 146.

The lower cutting ram 22 (Figures 4 and 5) is of approximately H-shaped cross-section with longitudinal grooves 152 engaged by guide bars 154 bolted as at 156 to the opposite side walls of the lower housing 38. A driving connection between the ram 22 and the endless sprocket chains 72 is obtained by means of toothed rack bars 156 (Figure 7), the teeth of which project between the rollers of the chain 72 (Figure 1) and intermesh therewith. The rack bars 156 are secured to the ram 22 in laterally-spaced relationship. The forward end of the lower ram 22 is grooved as at 158 to receive a back-up block 160 (Figure 8) having a longitudinal channel or groove 162 on the upper side thereof to receive the bead or ridge formed at the joint between the metal plates as a result of the welding operation. The backup block 160 is bored and threaded as at 164 (Figure 7) in longitudinally-spaced locations to receive guide bolts 166 which pass loosely through holes 168 in the bottom wall 170 of the forward portion of the lower cutting ram 22 and are surrounded by compression spring 172 which urge the backup block 160 in an upward direction against the plates or sheets U and V being welded.

The rearward portion of the lower cutting ram 22 is provided with longitudinally-spaced transverse or vertical bores 174 of rectangular cross-section which receive cutting tool holders 176 in which are mounted cutting tools or tool bits 178. The tool holders 176 are arranged so that the tool bits 178 may be removed and sharpened in the ordinary manner (Figure 7). The tool bits 178 are arranged with their cutting edges disposed in stepped relationship so that the first cutting tool 178 cuts the outermost layer, the second cutting tool 178 cuts a deeper layer behind it, the third cutting tool 178 cuts a still deeper layer, and so forth in a similar manner, so that each cutting tool exerts a fraction of the total cutting action and the entire cut is distributed evenly between the various cutting tools 178.

Bolted or otherwise secured to the top edges of the lower housing 38 are lower clamping members 180 and 182 (Figures 6 and 8) which overhang the top of the lower cutting ram 22 and extend toward one another into close proximity to the opposite sides of the backup block 160. The lower clamping members 180 and 182 are parallel and extend along the edges of the sheets or plates U and V to be welded, with their upper surfaces engaging the lower surfaces of the sheets U and V.

Upper unit construction

The upper clamping, welding and cutting unit 18 somewhat resembles the lower unit 16 in its driving arrangement with the important difference that the upper driving chains 184 travel in orbits in vertically-spaced horizontal planes rather than in horizontally-spaced vertical planes as is the case with the lower driving chains 72 (Figure 6). The upper driving chains 184 are driven by drive sprockets 186 mounted and keyed in vertically-spaced relationship on a vertical shaft 188 journaled in upper and lower bearing bosses 190 of the hollow upper unit housing 192. Keyed to the upper end of the vertical shaft 188 is a worm gear or worm wheel 194 with which meshes a worm 196 on a horizontal shaft 198 journaled at one end in a bearing boss 200 inside the upper housing 192. The opposite end of the shaft 198 passes through a tubular shaft 202 to the inner end of which is keyed a bevel pinion 204 which meshes with a bevel pinion 206 keyed to a vertical shaft 208 journaled in a bearing block 210 and extending below it to a location adjacent the elongated pinion 96. Keyed to the lower end of the vertical shaft 208 is a pinion 212 which meshes with the elongated pinion 96 in such a manner that as the upper clamping, welding and cutting unit 18 is raised and lowered to clamp or unclamp the sheet or plate V, the pinion 212 slides axially along the elongated pinion 96 while maintaining a driving connection with it (Figures 1 and 6).

The upper driving chains 184, like the lower driving chains 72, are of the endless link and roller type and drivingly connected to the upper ram 24 by toothed rack bars 213 secured thereto like the rack bars 156. The upper chains 184 are similarly supported by guide bars 214 and 216 (Figure 5). The guide bars 214, like the lower guide bars 106, are bolted to the inner sides of the upper housing 192, whereas the guide bars 216 are bolted to an upstanding bracket 218 within the housing 192. The upper driving chains 184 are elsewhere supported upon grooved rollers 220 and 222 arranged on vertical shafts 224 and 226 respectively (Figure 3), whereas the opposite ends of the orbits of the endless chains 184 are mounted on an adjustable chain-collapsing device, generally designated 228, which is generally similar in construction to the chain-collapsing device 126 but differs in minor respects. The chains 184 are supported on vertically-spaced end sprockets 230 mounted on a vertical shaft 232 which is mounted at its opposite ends in eccentric flanged discs 234. These resemble the flanged discs 148 and are similarly mounted in suitably-bored parallel slide plates 236 having threaded adjusting rods 238 similarly connected thereto and similarly carrying adjusting nuts 240 (Figure 2).

A link 242, similar to the link 144 of Figure 1, is bored at one end to receive the vertical shaft 232 and at its other end to receive the shaft 244 which, like the shaft 124 of Figure 1, is mounted in the heads 246 on the ends of spring-pressed plungers 248 resiliently mounted in hollow arms 250 like the plungers 140 and hollow arms 128 of Figure 1. The hollow arms 250 are mounted on a shaft 252 which also carries a pair of axially-spaced idler sprockets 254 additionally supporting the driving chains 184. The opposite ends of the shaft 252 are mounted in the opposite parallel slide plates 236. The mode of collapsing the upper driving chains 184, however, is similar to that of collapsing the lower driving chains 72, namely by rotating the eccentric discs 234 by means of a hand crank 253 similar to the hand crank 149 and similarly provided with a reciprocable locking pin 255 selectively insertable in arcuately-spaced sockets in the top of the upper housing 192.

The hollow shaft 202 in which the shaft 198 is journaled is itself journaled as at 256 in the upper housing 192 (Figures 6 and 9). A toothed crown clutch member 258 is keyed to the hollow shaft 202 and a similarly-toothed crown clutch member 260 meshing therewith is similarly keyed to the inner shaft 198. The outer end of the shaft 198 is threaded as at 262 to receive a retaining nut 264 and also squared as at 266 to receive a wrench. A cap 268 is bolted over this adjustment mechanism, generally designated 270, to protect and conceal it.

The upper cutting ram 24 is of generally similar construction to the lower cutting ram 22 and is also of approximately H-shaped cross-section (Figure 4) but rotated 90 degrees. In other words, the lower ram 22 in cross-section resembles an H resting on its side, whereas the upper ram 24 in cross-section resembles an upright H. The upper cutting ram 24 is also similarly grooved at 272 to receive guide bars 274 bolted to the inner sides of the upper housing 192 (Figures 4, 6 and 8). Also bolted to the lower side of the upper housing 192 is an upper inner clamping member 276 which rests on top of the plate V and is offset similarly to the clamping member 182 immediately beneath it in order to engage the plate V close to its junction with the plate U.

The cutting mechanism in the upper cutting ram 24 differs from that of the lower cutting ram 22 in that the upper cutting tool holders 278 are mounted in vertical bores 280 of a rectangular cross-section in a carrier block 282 which is bolted as at 284 to the upper ram 24 (Figure 4) rather than being mounted directly in the cutting ram as in the case of the lower cutting ram 22. The cutting tool holders 278, however, are of similar construction to the cutting tool holders 176 and are similarly provided with cutting tool bits 286 (Figure 7) similarly arranged in stepped positions to cut successive layers off the plates U and V at the seam S.

The welding device 26 is bolted as at 288 to the forward end of the carrier block 282 and travels with it and the upper cutting tools 286, but slightly in advance thereof. The welding device 26 is of conventional construction and its details are beyond the scope of the present invention, as any suitable welding apparatus may be used. The welding device 26 shown for purposes of illustration is of the so-called shielded electric arc type, and the device 26 is frequently called a welding torch. The welding device 26 is provided with a welding rod or electrode 290 which projects downward through the device into close proximity to the junction of the plates U and V and is supplied with electricity through a flexible cable 292. As the welding rod or electrode 290 is consumed in the welding operation, it is fed automatically downward by self-contained mechanism within the welding device 26, by mechanism well-known to welding engineers.

*Upper unit raising and lowering mechanism*

The upper clamping, welding and cutting unit 18 is raised and lowered upon four guide rods 300, the lower ends of which are seated in suitably bored bosses 302 in the auxiliary housing 86 (Figures 4 and 6) and threaded to receive retaining nuts 304 on their reduced diameter lower ends 306. The guide rods 300 pass upward through vertically-bored guide bosses 307 (Figure 3) in the upper housing 192 and their upper reduced diameter ends 308 pass through vertically-bored bosses 310 secured to the sides of an elongated hollow head 312 of box-like construction, and are threaded to receive retaining nuts 314.

The upper housing 192 is provided at its opposite ends with bearing brackets 316 bolted thereto and containing axially-aligned pivot shafts 318 upon which the lower ends of swinging vertical links 320 are pivotally mounted (Figures 2 and 4). The upper ends of the links 320 are bolted as at 322 to approximately horizontal links 324 which are connected as at 326 to the opposite ends of a pivot shaft 328. The pivot shaft 328 (Figure 2) extends from end to end of the head 312 and serves as an equalizer by passing through the outer ends of suitably bored arms 330 bolted or otherwise secured to the opposite ends of the head 312.

The upper unit 18 is raised by hydraulic cylinders 332 mounted at opposite ends of the head 312 and containing pistons 334 and supplied with pressure fluid through the pipes 336 (Figure 1). Bolted as at 338 to the upper ends of the pistons 334 are upper cross heads 340, the opposite ends of which are bored to receive the threaded upper ends of connecting rods 342 secured thereto as by the nut 344. The lower ends of the connecting rods 342, of which there are four, are pinned or otherwise secured to the opposite ends of lower cross heads 346 which in turn are bolted as at 348 to brackets 350 rising from the upper wall of the upper housing 192. As a consequence, when pressure fluid is supplied to the hydraulic cylinders 332, the consequent rise of the pistons 334 and upper and lower cross heads 340 and 346 raises the upper unit 18 in its entirety.

Welded or otherwise secured to the lower sides of the head 312 are contact plates 352 (Figures 1 and 5) which are spaced apart from one another along the head 312. These contact plates 352 are engaged by clamping plungers 354 which are reciprocable in clamping cylinders 356 supplied with pressure fluid through pipes 358 connected to a supply pipe 260 leading to a hydraulic pump or other source of pressure fluid similar to that supplying the pipes 336 mentioned above. The clamping cylinders 356 are flanged as at 362 and seated in bores 364 in the top of the upper housing 192. Consequently, when pressure fluid is supplied to the clamping cylinders 356, the latter move downward under the thrust applied by their plungers 354 against the contact plates 352, causing the upper inner clamping member 276 to engage the sheet or plate V and clamp it firmly against the lower inner clamping member 182, as described below in connection with the operation of the invention.

*Independent clamping unit*

The independent clamping unit 20, provided for the purpose of clamping the sheet or plate U against the lower outer clamping member 180, is mounted in a housing 366 bolted as at 368 to the side of the lower housing 38 (Figures 3, 5 and 6). The housing 366 has laterally-spaced side walls 370 and an upper or bridge portion 372 supported between them and extending over an elongated opening 374 through which the plate or sheet U is inserted. The bridge portion 372 is provided with spaced lower and upper horizontal walls 376 and 378 respectively (Figure 5) and has multiple spaced bearing bosses 380 projecting horizontally inward from the front wall 382 thereof. The bosses 380 are bored coaxially to receive a pivot shaft 384 upon which multiple clamping levers 386 are individually and pivotally mounted, with one clamping lever 386 supported between each pair of bearing bosses 380.

Each clamping lever 386 has a clamping member 388 in the form of an elongated plate of roughly L-shaped cross-section secured to the lower forward end thereof adjacent the junction of the sheets or plates U and V to be welded, and immediately above the lower outer clamping member 180 (Figures 3 and 8). The upper end of each lever 386 is provided with a plate-like contact portion 390 which is disposed in spaced parallel relationship with the lower horizontal wall 376 of the bridge portion 372 and is urged downwardly toward it by a compression coil spring 392 disposed between the upper horizontal wall 378 and the plate-like portion 390. Mounted between the lower horizontal wall 378 and the plate-like portion 390 is an elongated inflatable tube 394 extending substantially the entire length of the bridge portion 372 and having at one end a connection 396 for a compressed air supply pipe 398 leading to a source of compressed air or, if desired, to a source of hydraulic pressure fluid. The inflatable tube 394 is thus mounted in an enclosure formed between the front wall 382 and rear wall 400 of the bridge portion 372, and between the lower wall 376 thereof and the plate-like portion 390 of each clamping lever 386. The inflatable tube 394 is made of any suitable resilient material, such as rubber, synthetic rubber or synthetic plastic.

*Sheet-alignment arrangement*

In order to properly align the sheets so that they will fit properly end-to-end and form a continuous unbroken composite strip made up of sheets welded together end-to-end, an improved aligning arrangement has also been devised according to the present invention. In order to insure that the sheets are properly centered on the bed of the machine, centering devices, generally designated 402 are provided at intervals on the bed of the machine along the path of travel of the sheets U and V. Four such aligning devices 402 are shown in Figures 10 and 11, these being of similar construction, hence a single description of the centering device 402, as shown in Figure 12, will suffice for all.

Each centering device 402 consists of a supporting guide structure, generally designated 404, of approximately channel-shaped cross-section, and of length sufficient to span the entire width of the bed of the machine. The central portion of each guide structure 404 is cut away at its opposite end to provide parallel dovetail guide grooves 406 in which dovetail-edged nuts 408 and 410 (Figure 12) are reciprocably mounted. The nuts 408 and 410, as their name indicates, are in the form of dovetail slide blocks having longitudinal oppositely-threaded bores 412 and 414 respectively receiving the correspondingly oppositely-threaded portions 416 and 418 of a double-ended screw shaft 420. Each of the screw shafts 420 is journaled as at 422 in an upstanding portion 424 at one end of the supporting guide structure 404 and provided with an annular retaining shoulder 426 on one side and a hand crank 428 on the other side thereof. Mounted on each of the nuts or threaded slide blocks 408 is a flanged guide roller 430 rotatable upon a pivot bolt 432 threaded into an upstanding portion 434 on each of the nuts 408 and 410. As a consequence when the hand crank 428 is turned by the operator to rotate the double-threaded screw shaft 420, the nuts 408 and 410 and their corresponding rollers 430 move toward or away from one another at equal rates of travel from the center line of the machine so that sheets of different widths are automatically maintained in centered positions in the machine. Horizontal rollers 436 mounted on axles 437 journalled in brackets 438 on the machine bed extension 439 at their opposite ends (Figure 10) provide additional support to the sheets U and V approaching the operating parts of the machine.

In order to further facilitate squaring up the first sheet inserted in the machine, two or more swinging stop arms, generally designated 440, are provided (Figures 2, 3, 5, 6 and 10), the hubs 442 of which are bored to receive and pivot on the pivot shaft 384. The upper end of each arm 440 is provided with an abutment or stop surface 444 against which the sheet V comes to rest while it is being positioned and while the arms 440 are in their lowered positions as described below in connection with the operation of the invention.

Also optionally associated with the sheet-aligning devices 402 and 440 is a shearing machine, generally designated 446, for cutting off the ends of the sheets squarely with their sides. This is shown diagrammatically as consisting generally of a supporting structure 448 and a cutter 450. The supporting structure 448 is provided with a slot 452 aligned vertically with the cutter blade 454 which reciprocates in a vertical slot 456 in a bridge portion 458. The bridge portion is spaced above the bed portion 460 forming the lower part of the supporting structure 448, the bridge portion 458 forming the upper part thereof connected to one another by upright end members 464. The passageway 462 is wide enough to accommodate the widest sheets U or V intended to be accommodated by the machine, with sufficient clearance to permit centering by the centering devices 402.

*Operation*

In the operation of the invention, let it be assumed that the parts are in the positions shown in the figures, but that no workpieces have been yet inserted in the machine. Let it also be assumed that the stop arms 440 have been swung downward to their operative positions, as indicated by the dotted arc in Figure 10. To insert the first plate or sheet V, the operator supplies pressure fluid, such as oil under pressure, to the uppermost hydraulic cylinders 332 (Figure 1) by way of the supply pipes 336, causing the cross-heads 340 and 346 to rise, together with their connecting rods 342 (Figure 4) and consequently lifting the entire upper clamping, welding and cutting unit 18 along the guide rods 300.

The first sheet or plate V is placed on the rollers 437 at the left-hand end of the machine as shown in Figure 10, and slid along until it engages the first centering devices 402. The forward end of the sheet is passed beneath the cutter blade 454 which is reciprocated vertically to shear off the rearward end of the sheet V so that it is square with the side edges thereof. The sheet V is then slid further along and centered by rotating the hand cranks 428 (Figure 12) in one direction or the other until the sheet V is positioned laterally at the desired location with reference to the center line of the machine.

The first sheet or plate V is then slid further along to the right (Figure 10) into the gap provided, as described above, between the upper and lower housings 192 and 38 above the auxiliary housing 86, and passes between the guide rods 300 (Figures 1, 4, 5 and 6). When the outer end of the sheet V has been properly located beneath the welding rod 290 and in line with the upper and lower cutting tool bits 286 and 178, such as by reciprocating the entire structure 14 along the base structure 12 by means of the hydraulic cylinder 48, the operator releases fluid from the upper hydraulic cylinders 332, causing the upper clamping, welding and cutting unit 18 to settle down upon the plate V, with the upper inner clamping member 276 pushing the outer end of the plate V downward against the lower inner clamping member 182. The operator then supplies pressure fluid by the pipes 360 and 358 to the lower hydraulic cylinders 356 (Figures 1 and 5), further forcing the upper unit 18 downward into clamping engagement with the plate V.

The operator now releases any pressure which may be standing in the inflatable tube 394, permitting the coil springs 392 to push the upper ends or plate-like portions 390 of the clamping levers 386 downward around the pivot shaft 384, raising the upper outer clamping members 388. The operator then swings the stops 440 upward out of the way and inserts the second sheet or plate U to be welded through the passageway 462 in the shearing machine 446, shears off its forward end by the blade 454, then slides it along into the aperture 374 (Figure 5) into the gap between the upper and lower outer clamping members 388 and 180 until its forward end firmly engages the rearward end of the already clamped sheet V. The operator then supplies pressure fluid through the pipe 398 to the inflatable tube 394, forcing the contact portions 390 of the clamping levers 386 upward around the pivot shaft 384, and consequently causing the clamping members 388 to be pushed downward, clamping the forward end portion of the sheet U firmly downward against the lower outer clamping member 180.

Assuming that the upper and lower cutting tools 286 and 178 have been properly aligned vertically with one another by the use of the adjusting mechanism 270 (Figures 6 and 9), as described subsequently below, the operator then energizes the welding device 26 and at the same time applies power to the shaft 92 (Figure 5), rotating the drive sprocket shafts 188 of the upper and lower drive sprockets 186 through the mechanism described above, and consequently causing the endless upper and lower driving chains 184 and 72 to move in their orbital paths.

The travel of the driving chains 184 and 72 in this manner causes simumltaneous reciprocation of the upper and lower rams 24 and 22 through the rack bars 213 and 156 (Figures 1, 3 and 7). As the welding rod 290 moves along the crack between the abutting edges of the sheets U and V (Figures 6, 7 and 8), the electric arc established therebetween by the welding device 26 melts the metal of the sheets U and V and causes a rib or bead to arise at the seam S between the plates U and V. Following immediately behind the welding rod 290, the upper and lower cutting tools 286 and 178 immediately remove the excess metal at the seam S above and below the plates U and V (Figure 7), while this excess metal is still hot and is still somewhat soft. From Figure 9 it will be seen that the bead at the seam S on the underside of the plates U and V is accommodated by the groove 162 in the back-up block 160, which at this time is forced upward by the springs 172 against the undersides of the plates U and V to give support thereto. Thus, the excess metal at the seam S between the sheets or plates U and V is removed as rapidly as it is formed, and in a single stroke of the upper and lower rams 24 and 22, in a rapid and efficient manner, without requiring double handling of the composite sheet W formed as a result of the welding together of the sheets U and V.

In the event that it is necessary to align the upper cutting tools 286 with the lower cutting tools 178 (Figure 7), the operator removes the cap 268 (Figures 3 and 9) and likewise unscrews the retaining nut 264 from the threaded end portion 262 of the shaft 198 and pulls the toothed clutch member 260 thereon out of engagement with the toothed clutch member 258 keyed to the hollow shaft 202. He then applies a wrench or crank to the squared portion 266 of the shaft 198, thereby rotating the upper driving sprockets 186 and moving the upper drive chains 184 without correspondingly moving the lower drive sprockets 70 and lower drive chains 72. As a consequence, the cutting tools 286 on the upper ram 24 move relatively to the lower cutting tools 176, which remain stationary at this time, so that alignment is easily achieved. When this has been accomplished, the operator removes the wrench from the squared portion 266 of the shaft 198, rethreads the nut 264 tightly against the outer toothed clutch member 268 so as to force its teeth solidly into driving engagement with the teeth of the inner toothed clutch member 258 and thus re-establishing the driving connection between them.

If it is desired to remove either of the two sets of chains 72 or 184 or to collapse them for other reasons, this is readily done by pulling the locking pins 151 and 255 of the hand cranks 149 and 253 out of their respective sockets and rotating these hand cranks to correspondingly rotate the eccentric discs 148 or 234 as desired. This action removes the support imparted to the lower chains 72 by the grooved rollers 122 or by the grooved rollers 246 to the upper chains 184, enabling either or both sets of chains to be collapsed or removed by collapsing the elbow linkages shown at the left-hand end of Figure 3 and in the lower left-hand corner of Figure 1. The upper and lower tool holders 278 and 176 are readily removed from their rectangular bores 280 and 174 in order to replace them or make repairs, as well as to insert and adjust the upper and lower cutting tools 286 and 178 therein.

It will be evident that the welding device 26 may be mounted on a separate slide reciprocably mounted on the machine rather than on one of the cutting rams 22 or 24 as described above, so as to accomplish the same purpose of welding and seam trimming on the same machine. The mounting of the welding device 26 on one of the cutting rams 22 or 24 is preferred, however, because of the greater simplicity of the machine obtained thereby.

*Modified flash-trimming machines*

The modified combined welding and flash-trimming machine, generally designated 470, shown in Figure 13, is generally similar to the flash-trimming machine 10 of Figure 1, and differs only in the means by which the flash is removed. In Figure 1, the flash is cut off by the successive cutting tools 178 and 286. In Figure 13, however, these cutting tools are replaced by flash-reducing rollers 472 and 474 mounted on axles 476 and 478 respectively, in the lower and upper cutting tool holders 176 and 278 respectively. The remainder of the construction, including the welding device 26 and the cutting rams 22 and 24, is similar to the machine of Figure 1. The advance cutting tool shown in dotted lines at the right-hand end of Figure 13 is described below in connection with Figure 16. The operation of the machine 470 is substantially the same as that of the machine 10 of Figure 1, except that the flash is rolled flush with the sheets instead of being cut off.

The modified combined welding and flash-trimming machine, generally designated 480, shown in Figures 14 and 15, is also generally similar to the flash-trimming machine 10 of Figure 1, except that the flash is removed by rotary flash-removing members 482 and 484 located respectively upon the lower and upper cutting rams 22 and 24. The rotary flash trimming members, for purposes of illustration, are shown as rotary milling cutters, but rotary grinding wheels may also be used for the same purpose, namely that of removing the flash which projects upward from the level of the joined sheets U and V at the seam of their junction. The rotary flash-removing members 482 and 484 are mounted upon shafts 486 and 488 journaled in the lower and upper cutting rams 22 and 24 and carrying reduction gears 490 and 492 meshing with worms 494 and 496 on shafts 498 and 500 respectively. The lower worm 494 is splined to the shaft 498 so as to travel axially relatively thereto. The shaft 498 is rotatably supported by a bracket 502 mounted on a shelf 504 on the bed of the machine, and carrying a gear 506 meshing with a pinion 508 on the armature shaft 510 of an electric motor 512. The upper worm 496, on the other hand, is fixedly mounted on the shaft 500, which is the armature shaft of an electric motor 514. The advance cutter shown in dotted lines at the right of Figure 14 is described in connection with Figure 16. The operation of the machine 480 is substantially the same as that of the machine 10 of Figure 1, except that the flash along the seam at the abutting welded ends of the sheets is removed by a rotary cutting or grinding action rather than a purely reciprocating cutting action by the fixed cutters 178 and 286 as in Figure 1.

The modified combined welding and flash-trimming machine, generally designated 520, shown in Figures 16 and 17, is also of similar construction to the machine 10 of Figure 1, except that an advance cutter, generally designated 522, is placed in front of the welding device 26 in line with the welding electrode or rod 290. This advance cutter 522 consists of a tool holder support 524 bolted or otherwise secured to the upper ram 24 at its forward end, and bored as at 526 to receive a cutting tool holder 528 similar to the cutting tool holders 176 and 278 described in connection with Figure 1. An advance cutting tool 530 is mounted in the advance cutting tool holder 528. Instead of having a flat end like the cutting tools 178 and 286, the advance cutting tool 530 has a V-shaped cutting tip 532 (Figure 17), the purpose of which is to bevel the abutting ends of the plates U and V so as to provide a trough-shaped groove at their junction for receiving the molten welding metal from the welding electrode or welding rod 290, as the latter passes over this junction immediately behind the advance cutting tool 530.

The operation of the modified combined welding and flash-trimming machine 520 is similar to that of the machine 10 described above in connection with Figure 1 as regards the removal of the flash by the cutting tools 178 and 286. The action of the advance cutting tool 230, however, in beveling the ends of the sheets U and V at their junction prior to welding them, provides a trough for the better reception of the molten welding metal and consequently reduces the amount of flash to be removed subsequently by the cutting tools 178 and 286.

What I claim is:

1. A combined welding and seam trimming machine for metal sheets comprising a frame structure having a support thereon for the sheets to be welded, opposed upper and lower pairs of sheet clamping elements disposed in spaced relationship on opposite sides of the line of junction between the sheets to be welded and engageable with the edge portions of the sheets adjacent said line of junction a pair of cutting ram structures reciprocably mounted on said frame structure for travel parallel to one another along the line of junction between the sheets to be welded and having seam-trimming cutters thereon, power-driven mechanism operatively connected to said ram structures for reciprocating said ram structures along said junction line, a welding device mounted on one of said structures for reciprocation therewith and having a welding element aligned with the path of travel of said cutters in advance of said cutters, and an elongated back-up member mounted on one of said ram structures and disposed lengthwise along said junction line, said back-up member extending upwardly through the space between the lower pair of sheet clamping elements into engagement with said sheets on the opposite side thereof from said welding element.

2. A combined welding and seam trimming machine for metal sheets comprising a frame structure having a support thereon for the sheets to be welded, a pair of cutting ram structures reciprocably mounted on said frame structure for travel parallel to one another along the line of junction between the sheets to be welded and having seam-trimming cutters thereon, power-driven mechanism operatively connected to said ram structures for reciprocating said ram structures along said junction line, and a welding device mounted on one of said structures for reciprocation therewith and having a welding element aligned with the path of travel of said cutters in advance of said cutters, one of said ram structures being mounted with its length disposed in laterally offset relationship to the length of the other ram structure.

3. A combined welding and seam trimming machine for metal sheets comprising a frame structure having a support thereon for the sheets to be welded, a pair of cutting ram structures reciprocably mounted on said frame structure for travel parallel to one another along the line of junction between the sheets to be welded and having seam-flattening rollers thereon, power-driven mechanism operatively connected to said ram structures for reciprocating said ram structures along said junction line, and a welding device mounted on one of said structures for reciprocation therewith and having a welding element aligned with the path of travel of said rollers in advance of said rollers.

4. A combined welding and seam trimming machine for metal sheets comprising a frame structure having a support thereon for the sheets to be welded, a pair of cutting ram structures reciprocably mounted on said frame structure for travel parallel to one another along the line of junction between the sheets to be welded and having seam-trimming cutters thereon, power-driven mechanism operatively connected to said ram structures for reciprocating said ram structures along said junction line, a welding device mounted on one of said structures for reciprocation therewith and having a welding element aligned with the path of travel of said cutters in advance of said cutters, and an advance cutter disposed forwardly of said welding device and movable along said line of junction immediately in advance of said welding device, said advance cutter being configured with beveled opposite cutting edges to bevel the abutting ends of said sheets to form a groove along said line of junction therebetween immediately prior to the welding thereof by said welding device.

5. A combined welding and seam trimming machine for metal sheets comprising a frame structure having a support thereon for the sheets to be welded, a pair of cutting ram structures reciprocably mounted on said frame structure for travel parallel to one another along the line of junction between the sheets to be welded and having seam-trimming cutters thereon, power-driven mechanism operatively connected to said ram structures for reciprocating said ram structures along said junction line, a welding device mounted on one of said structures for reciprocation therewith and having a welding element aligned with the path of travel of said cutters in advance of said cutters, and an advance cutter disposed forwardly of said welding device and movable along said line of junction imediately in advance of said welding device, said advance cutter having a cutting tip configured with beveled opposite cutting edges to bevel the abutting ends of said sheets to form a groove along said line of junction therebetween immediately prior to the welding thereof by said welding device.

References Cited in the file of this patent

UNITED STATES PATENTS

| | | |
|---|---|---|
| 1,512,788 | Morton | Oct. 21, 1924 |
| 1,531,824 | Smith | Mar. 31, 1925 |
| 1,560,699 | Kramer | Nov. 10, 1925 |
| 1,806,954 | Schmitz | May 26, 1931 |
| 1,809,653 | Wagner | June 9, 1931 |
| 1,832,719 | McBerty | Nov. 17, 1931 |
| 1,851,563 | Chapman | Mar. 29, 1932 |
| 1,854,522 | Morton | Apr. 19, 1932 |
| 1,995,104 | Morton | Mar. 18, 1935 |
| 2,015,955 | Morton | Oct. 1, 1935 |
| 2,078,365 | Biggert | Apr. 27, 1937 |
| 2,120,316 | Stone | June 14, 1938 |
| 2,143,969 | Biggert | Jan. 17, 1939 |

(Other references on following page)

UNITED STATES PATENTS

| | | | |
|---|---|---|---|
| 2,201,214 | Yoder | May 21, | 1940 |
| 2,256,558 | Harer | Sept. 23, | 1941 |
| 2,284,851 | Tiedemann | June 2, | 1942 |
| 2,393,198 | Somerville | Jan. 15, | 1946 |
| 2,580,817 | Morton | Jan. 1, | 1952 |
| 2,620,421 | Matosec | Dec. 2, | 1952 |
| 2,641,673 | Dahl | June 9, | 1953 |
| 2,663,784 | Iversen | Dec. 22, | 1953 |
| 2,683,432 | Schanz | July 13, | 1954 |